Figure 1:
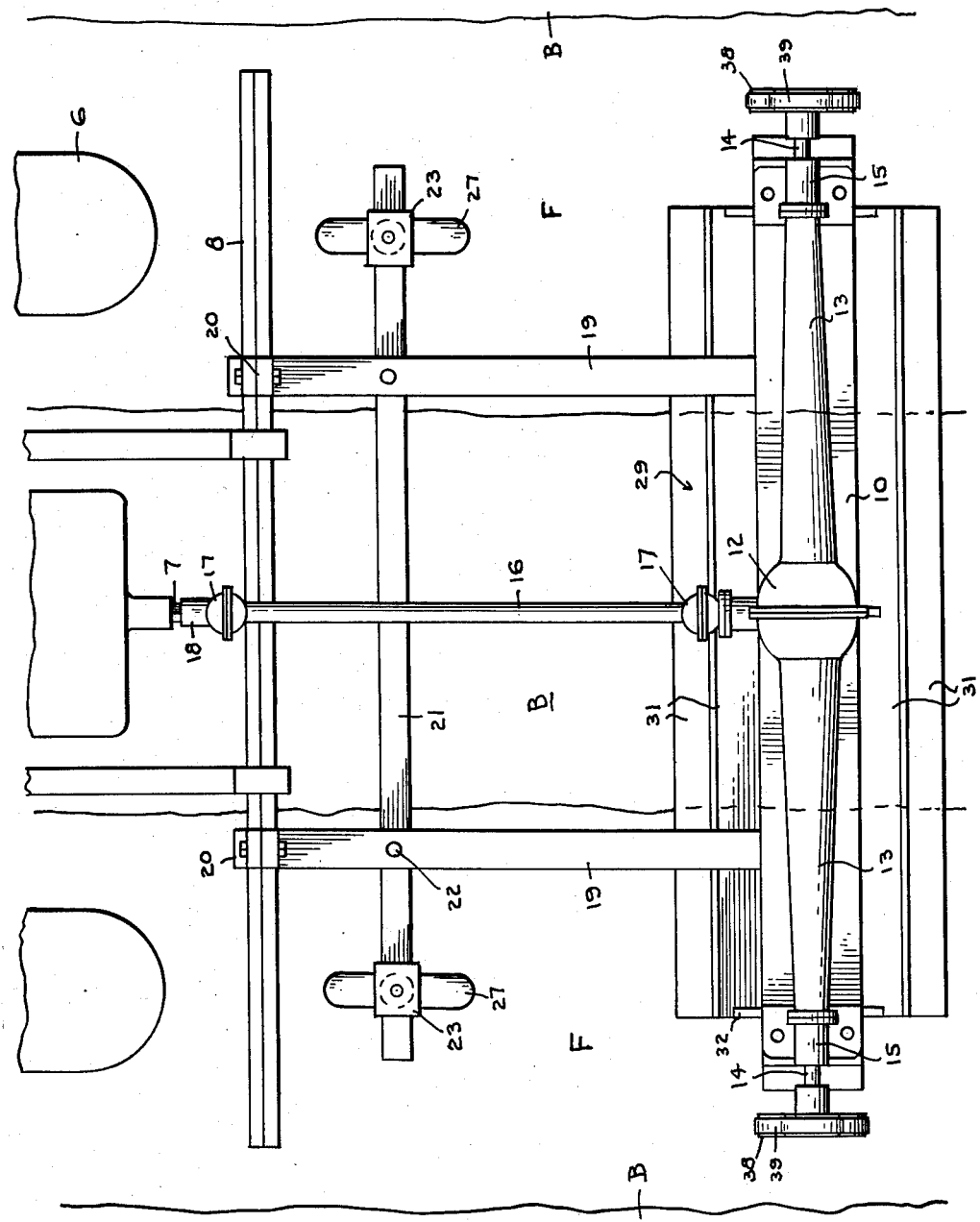

INVENTORS
LOUIS J. PRENNER
BY ANDREW MARELLO,
ATTORNEY

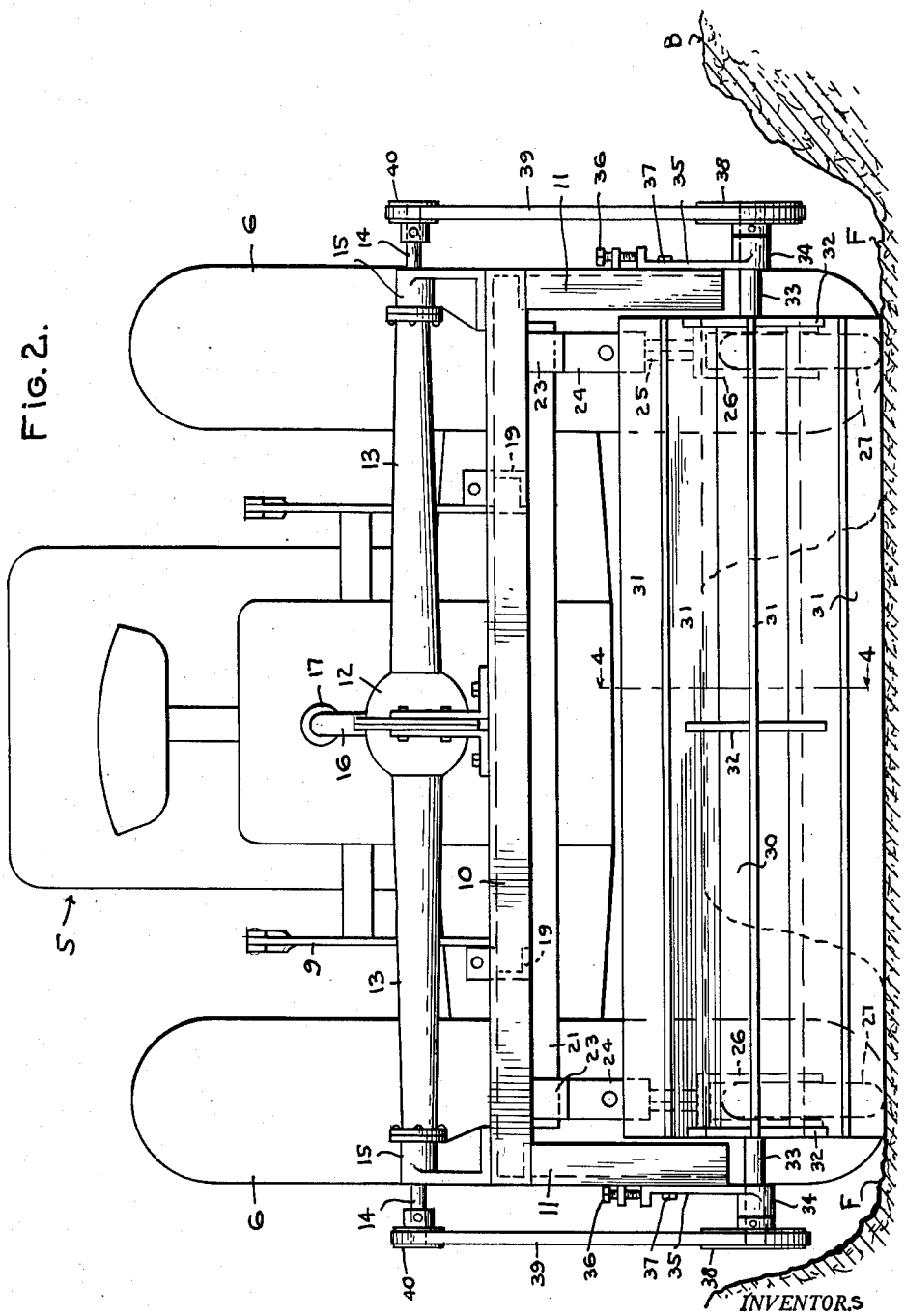

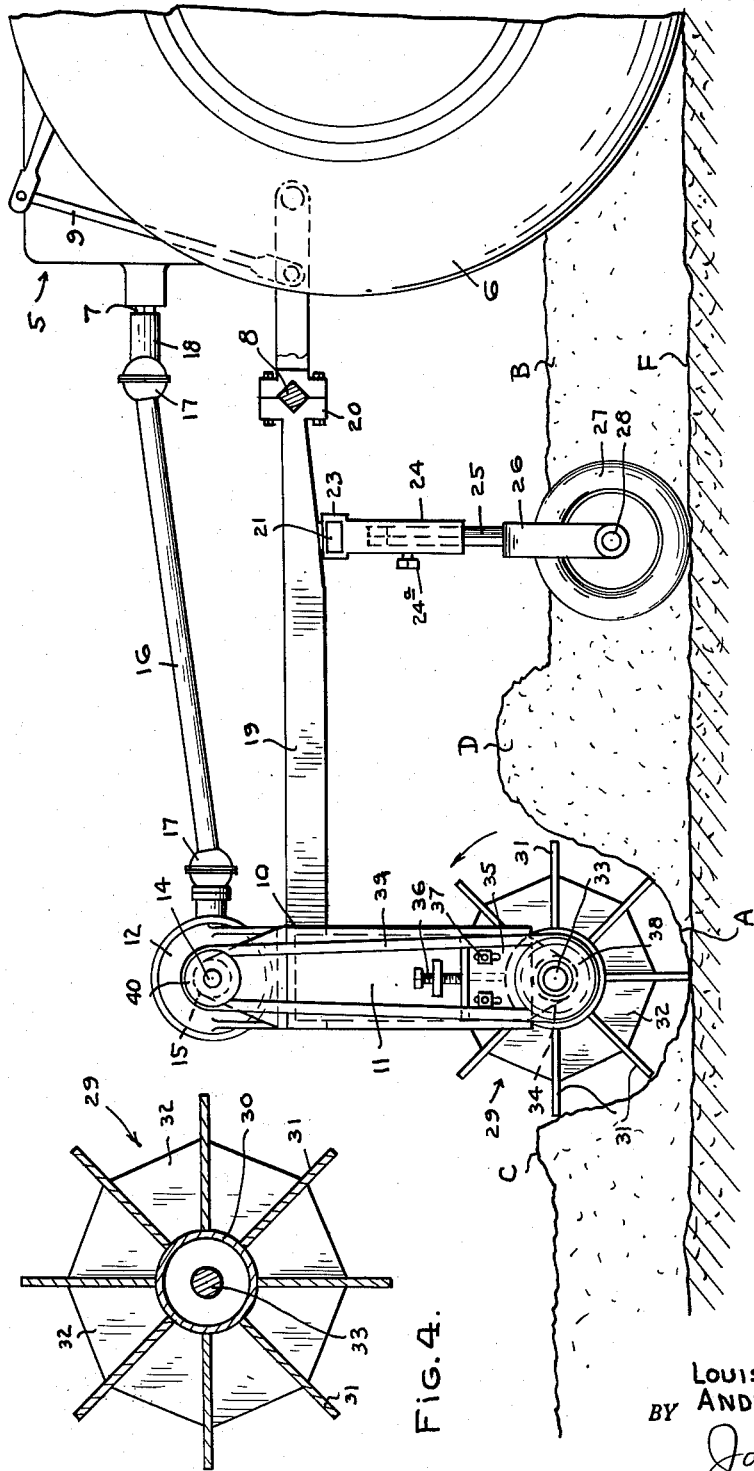

United States Patent Office 2,984,024
Patented May 16, 1961

2,984,024

DITCHING MACHINE

Louis J. Prenner and Andrew B. Marello, both of P.O. Box 2043, Pompano Beach, Fla.

Filed Sept. 19, 1958, Ser. No. 761,990

4 Claims. (Cl. 37—94)

This invention relates to a ditching device that is draft-attached to a conventional tractor having a power take-off and a tool supporting bar and with the tool supporting bar being hydraulically actuated to raise and lower implements connected thereto.

It is a common practice to plow and form rows of elevated plant beds at spaced apart intervals and to provide a furrow between each plant bed that constitutes the traverse course for the wheels of a tractor and that also forms drainage ditches upon opposite sides of each bed to protect the plants against too much water. It has been found necessary that ditches be cut transversely of the beds at predetermined points in their length to facilitate drainage of exceptional amounts of water that might normally accumulate in the ditches and with the transverse ditches also serving as walk-ways transversely of the field to avoid walking or climbing through the foliage of the plant beds.

The invention contemplates a ditching device that is connected to the tool bar of a tractor to be raised and lowered so that, when a ditch is dug in one plant bed, the ditching device may be elevated and the tractor driven forwardly to a predetermined point where the ditcher is lowered for cutting additional ditches, such being quickly performed at the desired point along the plant beds with a minimum of effort as compared with the usual method of digging the transverse ditches with hand tools.

A further object of the invention resides in a bladed elongated ditching device that is rotatable and positively driven from the power take-off of the tractor through suitable differential drive means and with the bladed device being belt-driven at its opposite ends by the differential.

A further object of the invention resides in an adjustable ground wheel supported from frame members of the ditching device that also rides within the furrow and to adjustably maintain the ditching device at a predetermined lower position to determine its depth of cutting action.

A further object of the invention resides in a ditching device for cutting transverse ditches across plant furrows in a manner that piles the excavated dirt upon the top of the plant bed in advance of the cutting device to thereby prevent thowing the dirt into the furrow.

Novel features of construction and operation of the device will be more clearly apparent during the course of the following description, reference being had to the accompanying drawings, wherein has been illustrated a preferred form of the device and wherein like characters of reference are employed to denote like parts throughout the several figures.

In the drawings:

Figure 1 is a top plan view of a device constructed in accordance with the invention, Figure 2 is a rear elevation of the device in operative ditch cutting position, Figure 3 is a side elevation of the device and, Figure 4 is a slightly enlarged transverse section taken through the cutter mechanism, substantially on line 4—4 of Figure 2, certain parts being omitted for sake of clarity.

Referring specifically to the drawings, the numeral 5 designates a conventional tractor, having ground wheels 6, a power take-off shaft 7, a tool supporting bar 8 which is substantially square in cross section as seen in Fig. 3 and the usual and conventional hydraulic lift arms 9 normally embodied in the tractor by which the tool bar may be elevated.

The ditching device embodies a rigid U-shape frame embodying a horizontal bar 10, which may be of channel shape in cross-section and, at its opposite ends, having rigid connection with depending and preferably channel shape legs 11. Rigidly connected upon the bar 10 intermediate its length is a conventional differential drive device 12 having oppositely extending shaft housings 13, carrying shaft sections 14. The shaft sections 14 are journaled in bearings 15 that are disposed at the outer ends of the bar 10. The differential is driven through the medium of a torque tube 16, having conventional universal connections 17 at its opposite ends. One universal 17 carries a sleeve 18 that has a splined or other driving connection with the power take-off shaft 7 of the tractor.

Inwardly from the ends of the bar 10, there is provided a pair of rigid arms 19, fixed with respect to the bar 10 against movement. The bars 19 extend forwardly and are clamped with respect to the tool bar 8 by any suitable clamp device 20 and whereby, when the tool bar is elevated, the arms 19 and the frame embodying the bar 10 and the legs 11 are simultaneously elevated. Also fixed with respect to the arms 19, is a cross rail 21, bolted or otherwise connected to the arms 19 as at 22. The rail 21 extends outwardly beyond the arms 19 for supporting adjustable blocks 23 and with the blocks 23 carrying depending tubes 24 and with the tubes 24 having a non-cylindrical internal bore. Adjustable vertically within the sleeves 24 are non-cylindrical pins 25 supporting, at their lower ends, yokes 26. The yokes 26 rotatably support ground wheels 27 upon a shaft 28. In normal use, the lateral adjustment of the ground wheels 27 is substantially in the line of travel of the wheels 6 of the tractor. The ground wheels 27 are adjusted to support the arms 19 at a predetermined level and to thereby support the frame embodying the bar 10 and the legs 11.

Rotatably supported between the legs 11 is a horizontally arranged cutting device, indicated as a whole by the numeral 29. The cutter device embodies a drum 30 having fixedly connected thereto, a plurality of radial cutter blades 31. The blades 31 are braced against flexing movement by webs 32, preferably welded to the blades adjacent their opposite ends and at a point intermediate the length of the cutter 29. The drum 30 has a fixed connection with a shaft 33 that is journaled at its opposite ends in bearings 34, carried upon adjustable plates 35 and with the plates 35 being vertically adjustable by screws 36. The plates 35 after adjustment are fixed against movement by set screws 37, having connection with the outer faces of the legs 11. The shaft 33 outwardly of the bearings 34 is provided with grooved pulleys 38, driven through the medium of endless V-belts 39, that are, in turn, driven by smaller grooved pulleys 40, carried upon the extended ends of the shaft sections 14. The plant beds are indicated by the letter "B," while the furrow is indicated by the letter "F."

*Operation*

In the use of the device, the arms 19 are fixedly engaged with the tool bar 8 by the clamps 20 and the sleeve 18 is simultaneously engaged with the power take-off shaft 7. It is then determined to what depth the ditch is to be cut and the ground wheels 27 are vertically adjusted to a corresponding depth, being dependent upon the depth of the furrow. After adjustment, the pin 25 is fixed against further movement vertically by a set screw 24a. The operator determines the points along the beds where the ditches are to be excavated and then lowers the bar 8, having previously set in motion the differential device 12 imparting rotation to the cutter device 29. Then, while lowering the tool bar 8, the cutter device is brought into engagement with the bed and continually lowered, until ground wheels 27 strike the bottom of the furrow, at which point the blades 31 have excavated the ditch for the full width of the bed, throwing the dirt upwardly and forwardly to be disposed upon the top of the bed as indicated at "D." A small amount of the dirt will be thrown rearwardly and this also will be piled upon the top of the bed as indicated at "C" thus, quickly and easily cutting the transverse ditch without throwing the dirt into the furrow, which obviously would be objectionable in that it would then be necessary to remove it manually to prevent the building up of a dam that might interfere with the free flow of water through the furrows. After the ditch, indicated at "A" has been cut, the tool bar, including the ditching mechanism is elevated by the hydraulic lift 9 to a point where it clears the top of the bed and the tratcor is then moved forwardly to the next point for a similar ditching action. It has been found desirable that the belts 39 be employed, since it is possible that the cutter blades 31 may strike a relatively immovable object, in which case the belts will slip without injury to the mechanism. However, it may be found desirable to employ a chain drive between the shafts 14 and 33.

It will be apparent from the foregoing that a very novel means has been provided to quickly excavate transverse ditches across elevated plant beds in a minimum of time, such ditches having previously been excavated by hand and such hand-digging has been extremely costly and requires a considerable amount of labor. The device is quickly and easily attached to a conventional tractor mechanism and, after the ditches have been excavated, the ditching device may be easily detached for storage purposes. The transverse ditches while being primarily formed as a drainage measure for those types of plant fields having raised plant beds, the ditches also furnish a very convenient walk-way across the field at the predetermined points, avoiding the necessity of climbing through the plants and the subsequent damage thereto in order to cross the field during the planting and cultivating season. The device is cheap to manufacture, is strong, durable and highly effective for the purposes indicated.

It is to be understood that the invention is not limited to the precise construction shown, but that changes are contemplated as readily fall within the spirit of the invention as shall be determined by the scope of the subjoined claims.

Having described our invention, what we claim as new and desire to secure by Letters Patent is:

1. A ditching device of the character described for use with a power tractor of the type that is provided with a tool bar and a power take-off shaft and with the tool bar being elevated by hydraulic lifts, the said ditching device embodying a U-shape frame having a top bar and vertically disposed legs at the opposite ends of said top bar, the top bar including a pair of spaced apart rigid arms that extend forwardly for clamping engagement with the tool bar and whereby the ditching device may be raised and lowered under the influence of the hydraulic lift toward and from a plant bed, adjustable bearings carried by each of the legs at their lower ends, a shaft journaled in the bearings and projecting outwardly beyond the opposite sides of the legs, grooved pulleys at the opposite ends of the said shaft, a drum fixed upon the shaft that spans the major width between the legs, radial blades carried by the drum and with the blades being coextensive in length with the drum, a differential drive device fixedly supported upon the top bar intermediate its length, shaft sections extending in opposite directions from the differential and with their opposite ends being journaled in bearings fixedly supported at the opposite ends of the top bar, the said shaft sections projecting outwardly beyond the last named bearings, grooved pulleys fixedly supported upon the projecting ends of the last named shafts, an endless belt engaging the first and second named pulleys at the opposite ends of the frame, a drive shaft extending from the differential for connection to the power take-off shaft of the tractor, a stop device for limiting the downward movement of the ditching device, the said stop device being adjustably supported upon the arms adjacent to their point of connection with the tool bar and between said point of connection and the drum, the said stop device limiting the downward cutting action of the blades whereby to limit their cutting depth to a point equal to the depth of row furrows, the said cutting device rotating in a direction to throw excavated dirt upwardly and forwardly to fall upon the top of a plant bed.

2. The structure according to claim 1 wherein the frame including the top bar and the end legs are formed of channel iron, the said shaft on which the drum is carried and its supporting bearings being vertically adjustable with respect to the end legs, whereby the belts are frictionally engaged with the several pulleys, the said differential embodying a differential housing that houses differential gearing, the said differential being provided with oppositely extending shaft housings and with the shaft housings having fixed connection with the second named bearings and the said drive shaft for the differential being provided at its opposite ends with universal joints and whereby the ditcher device may be elevated under the movement of the tool bar while remaining in constant driving connection with the power take-off shaft of the tractor.

3. The structure according to claim 1 wherein the radial blades are fixedly connected to the drum and with the blades being equidistantly spaced, braces that are positioned between the several blades for rigid connection thereto and for rigid connection to the drum and whereby to brace the blades against flexing, the said braces being disposed at the opposite ends of the drum and intermediate the length of the drum, the said drum and its cutting blades having a length calculated to extend beyond the width of a plant bed and to project into furrows upon opposite sides of the plant bed, the said drum being driven in a counterclockwise direction for throwing the dirt upwardly and forwardly to be piled upon the top of the plant bed.

4. The structure according to claim 1 wherein the stop device embodies a ground wheel that is rotatably supported by a yoke, a square shaft carried by the yoke, a socket device for receiving the squared shaft and with the shaft and the socket device being disposed in a vertical manner, a cross-rail carried by the arms and that projects outwardly beyond the arms, the said socket device being shiftable along the extended ends of the last named rail and whereby the ground wheels of the stop device may be outwardly adjusted to be disposed substantially intermediate the width of adjacent furrows, the said cutter device and associated mechanism all being disposed rearwardly of the tractor and parallel to the rear of the tractor and the tool bar, the said squared shaft being vertically adjustable in the socket and fixed in adjusted position by a set screw, the said stop device being raised and lowered with the ditching device under the influence of the vertical movement of the cutter bar.

References Cited in the file of this patent

UNITED STATES PATENTS

| | | |
|---|---|---|
| 1,318,920 | Reed | Oct. 14, 1919 |
| 1,756,495 | Rowley | Apr. 29, 1930 |
| 2,585,296 | Bennett et al. | Feb. 12, 1952 |
| 2,603,136 | Thomas | July 15, 1952 |
| 2,688,832 | Gordon | Sept. 14, 1954 |
| 2,701,941 | Heth | Feb. 15, 1955 |
| 2,781,624 | Mountz | Feb. 19, 1957 |

FOREIGN PATENTS

| | | |
|---|---|---|
| 1,081,708 | France | June 9, 1954 |